US005576374A

United States Patent [19]
Betso et al.

[11] Patent Number: 5,576,374
[45] Date of Patent: *Nov. 19, 1996

[54] IMPACT MODIFICATION OF FILLED THERMOPLASTICS

[75] Inventors: Stephen R. Betso, Horgen, Switzerland; Martin J. Guest, Terneuzen, Netherlands

[73] Assignee: The Dow Chemical Company, Midland, Mich.

[*] Notice: The portion of the term of this patent subsequent to Oct. 15, 2011, has been disclaimed.

[21] Appl. No.: 194,236

[22] Filed: Feb. 10, 1994

Related U.S. Application Data

[63] Continuation-in-part of Ser. No. 45,330, Apr. 8, 1993, which is a continuation-in-part of Ser. No. 945,034, Sep. 15, 1992, abandoned.

[51] Int. Cl.$^6$ ........................................ C08K 3/34
[52] U.S. Cl. .................. 524/451; 525/130; 525/317; 525/333.3; 525/239; 525/240; 52/518; 138/177; 138/DIG. 7
[58] Field of Search ................... 525/240, 239, 525/130, 317, 333.3; 524/451; 52/518; 138/177, DIG. 7

[56] References Cited

U.S. PATENT DOCUMENTS

| | | | |
|---|---|---|---|
| 3,645,992 | 2/1972 | Elston | 260/80.78 |
| 4,525,257 | 6/1985 | Kurtz et al. | 204/159.2 |
| 4,812,526 | 3/1989 | Rifi | 525/240 |
| 4,843,129 | 6/1989 | Spenadel et al. | 525/211 |
| 5,011,891 | 4/1991 | Spenadel et al. | 525/211 |
| 5,082,889 | 1/1992 | Koizumi et al. | 324/451 |
| 5,118,753 | 6/1992 | Hikasa et al. | 524/525 |

FOREIGN PATENT DOCUMENTS

| | | | |
|---|---|---|---|
| 684471 | 4/1964 | Canada | 400/91 |
| 294770B1 | 12/1988 | European Pat. Off. | |
| 294770A2 | 10/1991 | European Pat. Off. | |
| 942363 | 4/1985 | United Kingdom | |
| 1065568 | 5/1988 | United Kingdom | |

OTHER PUBLICATIONS

*Modern Plastics Encyclopedia*, vol. 65, No. 11, pp. 110 & 112, 1989 "Introduction to TPEs" by Charles D. Shedd.
*Modern Plastics Encyclopedia*, vol. 65, No. 11, p. 112, 1989, "Elastomeric Alloy TPEs" by C. P. Rader.
*Modern Plastics Encyclopedia*, vol. 65, No. 11, pp. 112–113, 1989, "Engineering TPEs" by Thomas W. Sheridan.
"FLEXOMER™ Polyolefins: A Bridge Between Polyethylene and Rubbers" by M. R. Rifi, H. K. Ficker and M. A. Corwin, pp. –7, 1990 Union Carbide Chemicals and Plastics Inc., Bound Brook, New Jersey.
*Proceedings of the First International Business Forum of Specialty Polyolefins SPO '91*, Sep. 1991, pp. 41–55, "The Marketing Challenge by Single Site Catalysts in Polyolefins" by Michael Jefferies.
*Polyolefins VII International Conference*, pp. 45–66, Feb. 1991, "Structure/Property Relationships in Exxpol™ Polymers" by C. S. Speed, B. C. Trudell, A. R. Mehta and F. C. Stehling.
*Tappi Journal*, Feb. 1992, pp. 99–103, "A New Family of Linear Ethylene Polymers Provides Enhanced Sealing Performance" by Dirk G. F. Van der Sanden and Richard W. Halle.
*Proceedings of the 1991 IEEE Engineering Society*, pp. 184–190, Sep. 1990, "New Speciality Linear Polymers (SLP) For Power Cables" by Monica Hendewerk and Lawrence Spenadel.

U.S. patent application Ser. No. 07/945,034 filed Sep. 15, 1992, H. Craig Silvis et al.

U.S. patent application Ser. No. 08/045,330 filed Apr. 8, 1993, H. Craig Silvis et al.

International Application No. PCT/US93/08731 filed in the United States Patent and Trademark Office Mar. 13, 1995, The Dow Chemical Company (H. Craig Silvis et al.).

*Primary Examiner*—Paul J. Thibodeau
*Assistant Examiner*—Mary Critharis

[57] ABSTRACT

Filled compositions having good low temperature impact performance made from a thermoplastic (e.g., a polyolefin such as polypropylene) and either at least one linear ethylene/$C_5$–$C_{20}$ α-olefin or at least one substantially linear ethylene/$C_3$–$C_{20}$ α-olefin polymer are disclosed. The compositions are easily molded and have particular utility in making automotive facia, parts and other household articles.

21 Claims, No Drawings

IMPACT MODIFICATION OF FILLED THERMOPLASTICS

CROSS-REFERENCE TO RELATED APPLICATIONS

This application is a continuation-in-part of pending application Ser. No. 08/045,330 filed Apr. 8, 1993, which itself is a continuation-in-part of application Ser. No. 07/945,034 now abandoned, filed Sep. 15, 1992, and is also related to application Ser. No. 07/776,130, filed Oct. 15, 1991, now U.S. Pat. No. 5,272,236, and to application Ser. No. 07/939,281 filed Sep. 2, 1992, now U.S. Pat. No. 5,278,272. The disclosures of all of the preceding applications and patents are incorporated herein by reference.

FIELD OF THE INVENTION

This invention relates to improved impact modification of specific thermoplastic polymers and polymer blends which contain fillers. The polymers and polymer blends comprise at least one linear or substantially linear ethylene/α-olefin polymer. The substantially linear ethylene/α-olefin polymer blended with the thermoplastic has a melt flow ratio, $I_{10}/I_2$, greater than or equal to 5.63, and a molecular weight distribution, $M_w/M_n$, less than or equal to the quantity $(I_{10}/I_2-4.63)$. Filled compositions consisting essentially of polypropylene, at least one substantially linear ethylene/1-octene copolymer, and at least one filler are especially preferred.

BACKGROUND OF THE INVENTION

Many different polymers and materials have been added to specific polymers to enhance the impact strength of the overall composition. For example, U.S. Pat. No. 5,118,753 (Hikasa et al.), incorporated herein by reference, discloses thermoplastic elastomer compositions said to have low hardness and excellent flexibility and mechanical properties consisting essentially of a mixture of an oil-extended olefinic copolymer rubber and an olefinic plastic. The olefinic plastic is polypropylene or a copolymer of polypropylene and an α-olefin of 2 or more carbon atoms. *Modern Plastics Encyclopedia/89*, mid October 1988 Issue, Volume 65, Number 11, pp. 110–117, the disclosure of which is incorporated herein by reference, also discusses the use of various thermoplastic elastomers (TPEs) useful for impact modification. These include: elastomeric alloys TPEs, engineering TPEs, olefinic TPEs (also known as thermoplastic olefins or TPOs), polyurethane TPEs and styrenic TPEs.

Thermoplastic olefins (TPOs) are generally produced from blends of an elastomeric material such as ethylene/propylene rubber (EPM) or ethylene/propylene diene monomer terpolymer (EPDM) and a more rigid material such as isotactic polypropylene. Other materials or components can be added into the formulation depending upon the application, including oil, fillers, and cross-linking agents. Generally, TPOs are characterized by a balance of stiffness (modulus) and low temperature impact, good chemical resistance and broad use temperatures. Because of features such as these, TPOs are used in many applications, including automotive facia and wire and cable operations.

Union Carbide Chemicals and Plastics Inc. announced in 1990 that they have developed a new cost effective class of polyolefins trademarked Flexomer™ Polyolefins that could replace expensive EPM or EPDM rubbers. These new polyolefins are said to have bridged the gap between rubbers and polyethylene, having moduli between the two ranges. Modulus of the rubber and of the formulation is not, however, the only criteria for evaluating a TPO formulation. Low temperature impact performance, sometimes measured by Gardner Impact at −30C. also is critical to a TPO composition's performance. According to the data contained in FIG. 4 of the paper "Flexomer™ Polyolefins: A Bridge Between Polyethylene and Rubbers" by M. R. Riff, H. K. Ficker and M. A. Corwin, more of the Flexomer™ Polyolefin needs to be added into the TPO formulation in order to reach the same levels of low temperature Gardner Impact performance as the standard EPM rubber, thus somewhat negating the benefits of the lower cost EPM/EPDM replacement. For example, using the data of FIG. 4 of the Riff et al paper, about 20% (by weight) of the EPM in polypropylene gives a Gardner Impact of about 22 J. at −30° C., while the same amount of Flexomer™ Polyolefin gives a −30° C. Gardner Impact of about 13 J.

In a paper presented on Sep. 24, 1991 at the 1991 Specialty Polyolefins Conference (SPO '91) (pp. 43–55) in Houston, Tex., Michael P. Jeffries (Exxpol Ethylene Polymers Venture Manager of Exxon Chemical Company) also reports that Exxon's Exact™ polymers and Plastomers can be blended into polypropylene for impact modification. Exxon Chemical Company, in the Preprints of Polyolefins VII International Conference, page 45–66, Feb. 24–27 1991, also disclose that the narrow molecular weight distribution (NMWD) resins produced by their EXXPOL™ technology have higher melt viscosity and lower melt strength than conventional Ziegler resins at the same melt index. In another recent publication, Exxon Chemical Company has also taught that NMWD polymers made using a single site catalyst create the potential for melt fracture ("New Specialty Linear Polymers (SLP) For Power Cables," by Monica Hendewerk and Lawrence Spenadel, presented at IEEE meeting in Dallas, Tex., September, 1991).

It is well known that narrow molecular weight distribution linear polymers disadvantageously have low shear sensitivity or low $I_{10}/I_2$ value, which limits the extrudability of such polymers. Additionally, such polymers possessed low melt elasticity, causing problems in melt fabrication such as film forming processes or blow molding processes (e.g., sustaining a bubble in the blown film process, or sag in the blow molding process etc.). Finally, such resins also experienced surface melt fracture properties at relatively low extrusion rates thereby processing unacceptably and causing surface irregularities in the finished product.

Fillers (e.g., talc and carbon black) are frequently used to improve the stiffness of the composition, or to decrease the coefficient of linear thermal expansion, or to decrease the overall cost of the formulation. However, such fillers are well known to simultaneously decrease impact performance (or toughness) of the resultant composition. For example, Joseph A. Randosta & Nikhil C. Trivedi in Talc (published in *Handbook of Fillers and Reinforcements for Plastics* 160 (Harry S. Katz & John V. Milewski eds.)) confirm that the impact performance of polymeric materials is generally decreased by the presence of rigid fillers, especially below the glass transition temperature (Tg) of the matrix material, due to the fillers' action as "stress concentrators."

Typically, the filler is incorporated at levels ranging from 1–50 weight percent of the formulation, depending upon the filler density. Furthermore, even at relatively high levels of filler loadings (e.g., greater than about 20%), typical thermoplastic formulations (e.g., polypropylene, an elastomeric rubber and talc) have very poor impact performance and do not function well in uses such as automotive facia. Low temperature impact resistance generally becomes more critical when the formulation is exposed to temperatures approaching the glass transition temperature of the rubber used in the formulation. Sometimes the room temperature impact resistance may even increase for highly filled formulations, but the low temperature impact resistance decreases rapidly with decreasing temperature.

Thus, while the development of new lower modulus polymers such as Flexomer™ Polyolefins by Union Carbide or Exact™ polymers by Exxon has aided the TPO marketplace, there continues to be a need for other more advanced, cost-effective polymers for compounding into polypropylene which improve or maintain low temperature impact performance and modulus, especially for highly filled systems.

SUMMARY OF THE INVENTION

Filled formulated compositions have now been discovered to have this combination of good low temperature impact performance and modulus, as well as good processability. The compositions comprise:

(A) a thermoplastic selected from the group consisting of thermoplastic polyurethanes, polyvinyl chlorides, styrenics, engineering thermoplastics, and polyolefins, (B) at least one linear or substantially linear ethylene/α-olefin polymer, and (C) at least one filler.

Both the substantially linear and the linear ethylene/α-olefin polymers are ethylene/α-olefin interpolymers having a short chain branching distribution index (SCBDI) greater than about 30 percent. Both the substantially linear and linear polymers have a single melting point, as opposed to traditional Ziegler polymerized polymers having two or more melting points (determined using differential scanning calorimetry (DSC)).

The substantially linear ethylene/α-olefin polymers can be characterized as having:

a) a melt flow ratio, $I_{10}/I_2, \geq 5.63$, b) a molecular weight distribution, $M_w/M_n$, defined by the equation: $M_w/M_n \geq (I_{10}/I_2) - 4.63$, and c) a critical shear rate at onset of surface melt fracture of at least 50 percent greater than the critical shear rate at the onset of surface melt fracture of a linear olefin polymer having about the same $I_2$ and $M_w/M_n$.

The substantially linear ethylene/α-olefin polymer can also be characterized as having:

a) a melt flow ratio, $I_{10}/I_2, \geq 5.63$, b) a molecular weight distribution, $M_w/M_n$, defined by the equation: $M_w/M_n \geq (I_{10}/I_2) - 4.63$, and c) a processing index (PI) less than or equal to about 70% of the PI of a linear olefin polymer having about the same $I_2$ and $M_w/M_n$.

The formulated compositions have good low temperature impact performance (e.g., Charpy Impact values at −30° C. for compositions containing about 20% by weight of the substantially linear olefin polymer of at least about 3.6 kJ/m²) and maintain adequate modulus, relative to a linear olefin polymer added at the about the same levels and at about the same $I_2$ and $M_w/M_n$.

DETAILED DESCRIPTION OF THE INVENTION

The term "linear ethylene/α-olefin polymers" means that the olefin polymer does not have long chain branching. That is, the linear ethylene/α-olefin polymer has an absence of long chain branching, as for example the linear low density polyethylene polymers or linear high density polyethylene polymers made using uniform branching (i.e., homogeneously branched) distribution polymerization processes (e.g., U.S. Pat. No. 3,645,992 (Elston), the disclosure of which is incorporated herein by reference) and are those in which the comonomer is randomly distributed within a given interpolymer molecule and wherein substantially all of the interpolymer molecules have the same ethylene/comonomer ratio within that interpolymer. The term "linear ethylene/α-olefin polymers" does not refer to high pressure branched polyethylene which is known to those skilled in the art to have numerous long chain branches. Typically, the linear ethylene/α-olefin polymer is an ethylene/α-olefin interpolymer, wherein the α-olefin is at least one $C_5$–$C_{20}$ α-olefin (e.g., 1-pentene, 4-methyl-1-pentene, 1-hexene, 1-octene and the like), preferably wherein at least one of the α-olefins is 1-octene. Most preferably, the ethylene/α-olefin interpolymer is a copolymer of ethylene and a $C_5$–$C_{20}$ α-olefin, especially an ethylene/1-octene copolymer.

The substantially linear ethylene/α-olefin interpolymers of the present invention are not in the same class as traditional linear ethylene/α-olefin polymers (e.g., heterogeneously branched linear low density polyethylene, linear high density polyethylene, or homogeneously branched linear polyethylene), nor are they in the same class as traditional highly branched low density polyethylene. The substantially linear olefin polymers useful in this invention surprisingly have excellent processability, even though they have relatively narrow molecular weight distributions. Even more surprising, the melt flow ratio ($I_{10}/I_2$) of the substantially linear olefin polymers can be varied essentially independently of the polydispersity index (i.e., molecular weight distribution ($M_w/M_n$)). This is contrasted with conventional heterogeneously branched linear polyethylene resins having rheological properties such that as the polydispersity index increases, the $I_{10}/I_2$ value also increases.

The term "substantially linear" ethylene/α-olefin polymers means that the polymer backbone is substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons.

The substantially linear ethylene/α-olefin polymers and interpolymers of the present invention are herein defined as in U.S. Pat. No. 5,272,236 and in U.S. Pat. No. 5,278,272. The substantially linear ethylene/α-olefin polymers and interpolymers useful for blending with the thermoplastics (e.g., polypropylene) are those in which the comonomer is randomly distributed within a given interpolymer molecule and wherein substantially all of the interpolymer molecules have the same ethylene/comonomer ratio within that interpolymer. The substantially linear ethylene/α-olefin polymers and interpolymers also have a single melting peak, as opposed to heterogeneously branched linear ethylene polymers, which have two or more melting peaks.

Long chain branching is defined herein as a chain length of at least about 6 carbons, above which the length cannot be distinguished using $^{13}C$ nuclear magnetic resonance spectroscopy. The long chain branch can be as long as about the same length as the length of the polymer back-bone.

Long chain branching is determined by using $^{13}C$ nuclear magnetic resonance (NMR) spectroscopy and is quantified using the method of Randall (*Rev. Macromol. Chem. Phys.*, C29 (2&3), p. 285–297), the disclosure of which is incorporated herein by reference.

The substantially linear ethylene/α-olefin polymers or copolymers for use in impact modifying the selected thermoplastic or polyolefin (usually polypropylene) in the present invention are interpolymers of ethylene with at least one $C_3$–$C_{20}$ α-olefin and/or $C_4$–$C_{18}$ diolefins. Copolymers of ethylene and 1-octene are especially preferred. The term "interpolymer" is used herein to indicate a copolymer, or a terpolymer, or the like. That is, at least one other comonomer is polymerized with ethylene to make the interpolymer.

Other unsaturated monomers usefully copolymerized with ethylene include, for example, ethylenically unsaturated monomers, conjugated or nonconjugated dienes, polyenes, etc. Preferred comonomers include the $C_3$–$C_{20}$ α-olefins especially propene, isobutylene, 1-butene, 1-hexene, 4-methyl-1-pentene, and 1-octene. Other preferred monomers include styrene, halo- or alkyl substituted styrenes, tetrafluoroethylene, vinylbenzocyclobutane, 1,4-hexadiene, and naphthenics (e.g., cyclopentene, cyclohexene and cyclooctene).

The density of the linear or substantially linear ethylene/ α-olefin polymers or copolymers (as measured in accordance with ASTM D-792) for use in the present invention is generally from about 0.85 g/cm$^3$ to about 0.91 g/cm$^3$, preferably from about 0.86 g/cm$^3$ to about 0.9 g/cm$^3$, more preferably from about 0.865 g/cm$^3$ to about 0.89 g/cm$^3$, and especially from about 0.865 g/cm$^3$ to about 0.88 g/cm$^3$.

Generally, the amount of the linear or substantially linear ethylene/α-olefin polymer incorporated into the composition is from about 1 percent to about 60 percent, by weight of the composition, preferably about 5 percent to about 40 percent, by weight of the composition, more preferably from about 5 percent to about 35 percent, by weight of the composition, and especially from about 15 percent to about 30 percent, by weight of the composition.

The molecular weight of the linear or substantially linear ethylene/α-olefin polymers for use in the present invention is conveniently indicated using a melt index measurement according to ASTM D-1238, Condition 190° C./2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the linear or substantially linear ethylene/ α-olefin polymers useful herein is generally from about 0.01 grams/10 minutes (g/10 min) to about 20 g/10 min, preferably from about 0.1 g/10 min to about 10 g/10 min, and especially from about 0.5 g/10 min to about 8 g/10 min.

Another measurement useful in characterizing the molecular weight of the linear or the substantially linear ethylene/α-olefin polymers is conveniently indicated using a melt index measurement according to ASTM D-1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. For the substantially linear ethylene/α-olefin polymers used in the compositions of the invention, the $I_{10}/I_2$ ratio indicates the degree of long chain branching, i.e., the higher the $I_{10}/I_2$ ratio, the more long chain branching in the polymer. The $I_{10}/I_2$ ratio of the substantially linear ethylene/α-olefin polymers is preferably at least about 7, especially at least about 8. The upper $I_{10}/I_2$ ratio of the substantially linear ethylene/ α-olefin polymers is preferably as high as about 50, especially as high as about 15. The $I_{10}/I_2$ ratio of the linear ethylene/α-olefin polymers is generally about 6.

Fillers which are useful in the improved low temperature impact formulations include talc, carbon black or graphite, calcium carbonate, clay, feedspar, nepheline, silica or glass, fumed silica, alumina, magnesium oxide, zinc oxide, barium sulfate, aluminum silicate, calcium silicate, titanium dioxide, titanates, glass microspheres, chalk. Of these fillers, talc, calcium carbonate, silica/glass, alumina and titanium dioxide are preferred and talc is most preferred. Ignition resistance fillers which can be used in the improved low temperature impact resistant formulations include antimony oxide, decabromobiphenyl oxide, alumina trihydrate, magnesium hydroxide, borates, and halogenated compounds. Of these ignition resistant fillers, alumina trihydrate and magnesium hydroxide are preferred. Other miscellaneous fillers include wood fibers/flours/chips, cotton, starch, glass fibers, synthetic fibers (e.g., polyolefin fibers), and carbon fibers.

The level of the filler depends upon the filler density; the higher the filler density, the more of it which can be added to the formulation without appreciably affecting the volume fraction of that filler. Accordingly, the level of the filler is discussed herein in terms of weight percent filler, based on the total formulation weight. In the novel impact modified formulations disclosed herein, the filler content ranges from about 0.1% to about 80%, preferably from about 5% to about 50% (except for carbon black, which is typically used at levels from about 0.1% to about 5%), more preferably from about 5% to about 40%, and especially from about 8% to about 30%. For the ignition resistant fillers, alumina trihydrate and magnesium hydroxide content ranges from about 1% to about 50%; for the remaining ignition resistant fillers, the content ranges from about 1% to about 20%.

Other additives such as antioxidants (e.g., hindered phenolics (e.g., Irganox® 1010), phosphites (e.g., Irgafos® 168)), cling additives (e.g., PIB), antiblock additives, pigments, colorants, and the like can also be included in the TPO formulations, to the extent that they do not interfere with the enhanced formulation properties discovered by Applicants.

The "rheological processing index" (PI) is the apparent viscosity (in kpoise) of a polymer measured by a gas extrusion rheometer (GER). The gas extrusion rheometer is described by M. Shida, R. N. Shroff and L. V. Cancio in *Polymer Engineering Science,* Vol. 17, no. 11, p. 770 (1977), and in "Rheometers for Molten Plastics" by John Dealy, published by Van Nostrand Reinhold Co. (1982) on page 97–99, both publications of which are incorporated by reference herein in their entirety. All GER experiments are performed at a temperature of 190° C., at nitrogen pressures between 5250 to 500 psig using a 0.0296 inch diameter, 20:1 L/D die with an entrance angle of 180°. For the substantially linear ethylene/α-olefin polymers described herein, the PI is the apparent viscosity (in kpoise) of a material measured by GER at an apparent shear stress of 2.15×10$^6$ dyne/cm$^2$. The novel substantially linear ethylene/α-olefin polymers described herein preferably have a PI in the range of about 0.01 kpoise to about 50 kpoise, preferably about 15 kpoise or less. The novel substantially linear substantially linear ethylene/α-olefin polymers described herein have a PI less than or equal to about 70% of the PI of a comparative linear ethylene/α-olefin polymer at about the same $I_2$ and $M_w/M_n$.

An apparent shear stress vs. apparent shear rate plot is used to identify the melt fracture phenomena. According to Ramamurthy in *Journal of Rheology,* 30(2), 337–357, 1986, above a certain critical flow rate, the observed extrudate irregularities may be broadly classified into two main types: surface melt fracture and gross melt fracture.

Surface melt fracture occurs under apparently steady flow conditions and ranges in detail from loss of specular gloss to the more severe form of "sharkskin". In this disclosure, the onset of surface melt fracture (OSMF) is characterized at the beginning of losing extrudate gloss at which the surface roughness of extrudate can only be detected by 40X magnification. The critical shear rate at onset of surface melt fracture for the substantially linear ethylene/α-olefin polymers is at least 50 percent greater than the critical shear rate at the onset of surface melt fracture of a linear ethylene/α-olefin polymer having about the same $I_2$ and $M_w/M_n$.

Gross melt fracture occurs at unsteady flow conditions and ranges in detail from regular (alternating rough and smooth, helical, etc.) to random distortions. For commercial acceptability, (e.g., in blown film products), surface defects should be minimal, if not absent. The critical shear rate at onset of surface melt fracture (OSMF) and onset of gross melt fracture (OGMF) will be used herein based on the changes of surface roughness and configurations of the extrudates extruded by a GER.

Both the linear and substantially linear ethylene/α-olefin polymers useful for forming the compositions described herein have homogeneous branching distributions. That is, the polymers are those in which the comonomer is randomly distributed within a given interpolymer molecule and wherein substantially all of the interpolymer molecules have the same ethylene/comonomer ratio within that interpolymer. The homogeneity of the polymers is typically described by the SCBDI (Short Chain Branch Distribution Index) or CDBI (Composition Distribution Branch Index) and is defined as the weight percent of the polymer molecules having a comonomer content within 50 percent of the median total molar comonomer content. The CDBI of a polymer is readily calculated from data obtained from techniques known in the art, such as, for example, temperature rising elution fractionation (abbreviated herein as "TREF") as described, for example, in Wild et al, *Journal of Polymer Science*, Poly. Phys. Ed., Vol. 20, p. 441 (1982), in U.S. Pat. No. 4,798,081 (Hazlitt et al.), or in U.S. Pat. No. 5,089,321 (Chum et al.) the disclosures of all of which are incorporated herein by reference. The SCBDI or CDBI for the linear and for the substantially linear olefin polymers used in the present invention is preferably greater than about 30 percent, especially greater than about 50 percent. The homogeneous ethylene/α-olefin polymers used in this invention essentially lack a measurable "high density" fraction as measured by the TREF technique (i.e., the homogeneous ethylene/α-olefin polymers do not contain a polymer fraction with a degree of branching less than or equal to 2 methyls/1000 carbons). The homogeneous ethylene/α-olefin polymers also do not contain any highly short chain branched fraction (i.e., the homogeneous ethylene/α-olefin polymers do not contain a polymer fraction with a degree of branching equal to or more than 30 methyls/1000 carbons).

Molecular Weight Distribution Determination of the Linear or Substantially Linear Ethylene/α-Olefin Polymers The linear and substantially linear ethylene/α-olefin interpolymer product samples are analyzed by gel permeation chromatography (GPC) on a Waters 150C. high temperature chromatographic unit equipped with three mixed porosity columns (Polymer Laboratories $10^3$, 10, $10^5$, and $10^6$), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Word in *Journal of Polymer Science, Polymer Letters*, Vol. 6, (621) 1968, incorporated herein by reference) to derive the following equation:

$$M_{polyethylene} = a * (M_{polystyrene})^b.$$

In this equation, a=0.4316 and b=1.0. Weight average molecular weight, $M_w$, is calculated in the usual manner according to the following formula: $M_w = \Sigma w_i * M_i$, where $w_i$ and $M_i$ are the weight fraction and molecular weight, respectively, of the $i^{th}$ fraction eluting from the GPC column.

For the linear and substantially linear ethylene/α-olefin polymers, the $M_w/M_n$ is preferably from about 1.5 to about 2.5.

The Substantially Linear Ethylene/α-Olefin Polymers

The substantially linear ethylene/α-olefin polymers are made by using suitable constrained geometry catalysts, preferably constrained geometry catalysts as disclosed in U.S. application Ser. Nos.: 545,403, filed Jul. 3, 1990; 758,654, filed Sept. 12, 1991; 758,660, filed Sep. 12, 1991; and 720,041, filed Jun. 24, 1991, the teachings of all of which are incorporated herein by reference. The monocyclopentadienyl transition metal olefin polymerization catalysts taught in U.S. Pat. No. 5,026,798, the teachings of which are incorporated herein by reference, are also suitable for use in preparing the polymers of the present invention, so long as the reaction conditions are as specified below.

Suitable cocatalysts for use herein include but are not limited to, for example, polymeric or oligomeric aluminoxanes, especially methyl aluminoxane or modified methyl aluminoxane (made, e.g., as described in U.S. Pat. No. 5,041,584, U.S. Pat. No. 4,544,762, U.S. Pat. No. 5,015,749, and/or U.S. Pat. No. 5,041,585, the disclosures of each of which are incorporated herein by reference) as well as inert, compatible, noncoordinating, ion forming compounds. Preferred cocatalysts are inert, noncoordinating, boron compounds.

Preparation of the Substantially Linear Ethylene/α-Olefin Polymer

The polymerization conditions for manufacturing the substantially linear ethylene/α-olefin polymers of the present invention are generally those useful in the solution polymerization process, although the application of the present invention is not limited thereto. Slurry and gas phase polymerization processes are also believed to be useful, provided the proper catalysts and polymerization conditions are employed.

Multiple reactor polymerization processes can also be used in making the substantially linear olefin polymers and copolymers of the present invention, such as those disclosed in U.S. Pat. No. 3,914,342, incorporated herein by reference. The multiple reactors can be operated in series or in parallel, with at least one constrained geometry catalyst employed in one of the reactors.

The Thermoplastics Which Are Impact Modified

The thermoplastic polymers which are beneficially impact modified by the addition of the linear or substantially linear olefin polymers discussed herein can be thermoplastic polyurethanes (e.g., Pellathane™ or Isoplast™ made by The Dow Chemical Company), polyvinyl chlorides (PVCs), styrenics, polyolefins (including, e.g., ethylene carbon monoxide copolymers (ECO) or linear alternating ECO copolymers such as those disclosed by U.S. Ser. No. 08/009,198, filed Jan. 22, 1993 in the names of John G. Hefner and Brian W. S. Kolthammer, entitled "Improved Catalysts For The Preparation of Linear Carbon Monoxide/Alpha Olefin Copolymers," the disclosure of which is incorporated herein by reference, and ethylene/propylene carbon monoxide polymers (EPCO)), various engineering thermoplastics (e.g., polycarbonate, thermoplastic polyester, polyamides (e.g., nylon), polyacetals, or polysulfones). Generally the polyolefin polymers which are most frequently used are polyethylene (e.g., high density polyethylene, such as that produced by the slurry polymerization process) or polypropylene. Generally at least one polypropylene is more frequently useful in the compositions disclosed herein.

The polypropylene is generally in the isotactic form of homopolymer polypropylene, although other forms of polypropylene can also be used (e.g., syndiotactic or atactic). Polypropylene impact copolymers (e.g., those wherein a secondary copolymerization step reacting ethylene with the propylene is employed) and random copolymers (also reactor modified and usually containing 1.5–7% ethylene copolymerized with the propylene), however, can also be used in the TPO formulations disclosed herein. A complete discussion of various polypropylene polymers is contained in *Modern Plastics Encyclopedia/89*, mid October 1988 Issue, Volume 65, Number 11, pp. 86–92, the entire disclosure of which is incorporated herein by reference. The molecular weight of the polypropylene for use in the present invention is conveniently indicated using a melt flow measurement according to ASTM D-1238, Condition 230° C./2.16 kg (formerly known as "Condition (L)" and also known as $I_2$). Melt flow rate is inversely proportional to the molecular weight of the polymer. Thus, the higher the molecular weight, the lower the melt flow rate, although the relationship is not linear. The melt flow rate for the polypropylene useful herein is generally from about 0.1 grams/10 minutes (g/10 min) to about 75 g/10 min, preferably from about 0.5 g/10 min to about 60 g/10 min, especially from about 1 g/10 min to about 50 g/10 min, and most especially from about 12 g/10 min to about 40 g/10 min.

The formulations are compounded by any convenient method, including dry blending the individual components and subsequently melt mixing, either directly in the extruder used to make the finished article (e.g., the automotive part), or by pre-melt mixing in a separate extruder (e.g., a Banbury mixer). Dry blends of the compositions can also be directly injection molded without pre-melt mixing.

There are many types of molding operations which can be used to form useful fabricated articles or parts from the TPO formulations disclosed herein, including various injection molding processes (e.g., that described in *Modern Plastics Encyclopedia/89*, Mid October 1988 Issue, Volume 65, Number 11, pp. 264–268, "Introduction to Injection Molding" and on pp. 270–271, "Injection Molding Thermoplastics", the disclosures of which are incorporated herein by reference) and blow molding processes (e.g., that described in *Modern Plastics Encyclopedia/89*, Mid October 1988 Issue, Volume 65, Number 11, pp. 217–218, "Extrusion-Blow Molding", the disclosure of which is incorporated herein by reference) and profile extrusion. Some of the fabricated articles include automotive bumpers, facia, wheel covers and grilles, as well as other household and personal articles, including, for example, freezer containers.

EXAMPLES

Various polymer compositions are formed using a Clextral compounder (35 kg/hour, with zone temperatures set at 180° C., 210° C., and 190° C.). The extrudate from the Clextral compounder is pelletized for future use in making molded parts for testing. Table 1 describes the polymer compositions tested for impact resistance and the percentage (by weight) of each component in the composition. In Table 1, "PP1" stands for polypropylene having a melt flow rate (measured at 230° C./2.16 kg) of 12 g/ 10 min; "PP2" stands for polypropylene having a melt flow rate (measured at 230° C./2.16 kg) of about 40 g/10 min; "SLEP" stands for the substantially linear ethylene/1-octene copolymer having a density of about 0.87 g/cm³, $I_2$ of about 1 gms/10 minutes, $I_{10}/I_2$ of about 7.3, $M_w/M_n$ of about 2; and "EP" stands for ethylene/propene rubber (grade VM 41 made by Advanced Elastomer Systems) having a melt flow rate (measured at 230° C./2.16 kg) of about 2.1 g/10 min and a density of about 0.89 g/ cm³.

TABLE 1

| Sample | % PP1 | % PP2 | % SLEP | % EP Rubber | % talc | % carbon black | % Irganox 1010 |
|---|---|---|---|---|---|---|---|
| A* | 98.8 | 0 | 0 | 0 | 0 | 1.0 | 0.2 |
| B* | 75.75 | 0 | 23.06 | 0 | 0 | 1.0 | 0.2 |
| C* | 70.23 | 0 | 28.57 | 0 | 0 | 1.0 | 0.2 |
| D* | 89.71 | 0 | 0 | 0 | 9.09 | 1.0 | 0.2 |
| 1 | 70.16 | 0 | 21.38 | 0 | 7.26 | 1.0 | 0.2 |
| 2 | 65.46 | 0 | 26.64 | 0 | 6.7 | 1.0 | 0.2 |
| E* | 75.67 | 0 | 0 | 0 | 23.13 | 1.0 | 0.2 |
| 3 | 61.27 | 0 | 18.83 | 0 | 18.71 | 1.0 | 0.2 |
| 4 | 57.52 | 0 | 23.53 | 0 | 17.75 | 1.0 | 0.2 |
| F* | 70.16 | 0 | 0 | 21.38 | 7.26 | 1.0 | 0.2 |
| G* | 61.27 | 0 | 0 | 18.83 | 18.71 | 1.0 | 0.2 |
| H* | 0 | 70.23 | 28.57 | 0 | 0 | 1.0 | 0.2 |
| 5 | 0 | 57.52 | 23.53 | 0 | 17.75 | 1.0 | 0.2 |

*Comparative example only; not an example of the invention

Each compounded blend or polymer is injection molded on an Engel ES 300 injection molding machine set as described in Table 2:

TABLE 2

| Zone 1 | 210° C. |
|---|---|
| Zone 2 | 205° C. |
| Zone 3 | 200° C. |
| Zone 4 | 190° C. |
| Mold temperature | 60° C. |

Falling dart impact properties (energy to break) are then determined in accordance with ISO TC 61 (4 m/s, 38 mm support); the prenotched test parts are stored overnight at the designated temperature and immediately tested on removal from cold storage. The results are shown in Table 3:

TABLE 3

| Sample | Falling Dart Impact at -30° C. (energy to break) (J) | Falling Dart Impact at 0° C. (energy to break) (J) | Falling Dart Impact at 23° C. (energy to break) (J) |
|---|---|---|---|
| A* | 0.8 | 2 | 2.5 |
| B* | 34.8 | 73.4 | 58.8 |
| C* | 61.9 | 96.9 | 57 |
| D* | 1.7 | 3.3 | 2 |
| 1 | 26.7 | 101.5 | 47.3 |
| 2 | 74.8 | 90.7 | 61.1 |
| E* | 3.4 | 4 | 2.8 |
| 3 | 17.8 | 66.5 | 39.4 |
| 4 | 42.2 | 82.5 | 54.4 |
| F* | 15.5 | 60.3 | 50.8 |
| G* | 10.9 | 30.3 | 43.9 |
| H* | 57.8 | 68.7 | 52.9 |
| 5 | 51.8 | 71.1 | 46.2 |

*Comparative example only; not an example of the invention

Table 4 displays Izod impact strength at room temperature (about 23° C.), 0° C. and -30° C. tested in accordance with ISO 180–1982 cut from multipurpose specimens from molded parts made from the compositions and in accordance with ISO 3167 (4 mm "campus" bars); the pre-notched test parts are stored overnight at the designated temperature and immediately tested on removal from cold storage:

TABLE 4

| Sample | Izod Impact at -30° C. (kJ/m$^2$) | Izod Impact at 0° C. (kJ/m$^2$) | Izod Impact at 23° C. (kJ/m$^2$) |
|---|---|---|---|
| A* | 2.9 | 2.6 | 2.5 |
| B* | 3.8 | 4.4 | 30.9 |
| C* | 4.8 | 8.7 | 43.5 |
| D* | 3 | 3.2 | 3.3 |
| 1 | 4.8 | 5.9 | 31.3 |
| 2 | 5.5 | 25.1 | 44 |
| E* | 2.4 | 3.1 | 2.7 |
| 3 | 3.9 | 7.4 | 20.4 |
| 4 | 5.1 | 15.2 | 33.1 |
| F* | 4.3 | 7.3 | 25.8 |
| G* | 3.7 | 5.6 | 16 |
| H* | 5.4 | 26.5 | 44.2 |
| 5 | 4.6 | 12.5 | 30.7 |

*Comparative example only; not an example of the invention

TABLE 5

| Sample | Charpy Impact at -30° C. (kJ/m$^2$) | Charpy Impact at 0° C. (kJ/m$^2$) | Charpy Impact at 23° C. (kJ/m$^2$) |
|---|---|---|---|
| A* | 1.8 | 2 | 2.8 |
| B* | 4 | 4.9 | 12.1 |
| C* | 4.8 | 11 | 29.1 |
| D* | 1.9 | 2.4 | 3.3 |
| 1 | 3.8 | 6.5 | 16.3 |
| 2 | 5.6 | 10 | 28.3 |
| E* | 1.9 | 2.3 | 2.8 |
| 3 | 3.2 | 5.1 | 14.9 |
| 4 | 4.2 | 9.5 | 25.2 |
| F* | 3.8 | 7.2 | 15.9 |
| G* | 3.4 | 4.3 | 10.1 |
| H* | 3.2 | 9.3 | 29.8 |
| 5 | 5 | 10.5 | 27.8 |

*Comparative example only; not an example of the invention

TABLE 6

| Sample | Yield Stress (MPa) | Elong. at Yield (%) | Rupture Stress (MPa) | Elong. at Rupture (%) | Tensile Modulus (MPa) | Flexural Modulus (MPa) |
|---|---|---|---|---|---|---|
| A* | 32.7 | 9.3 | 16.8 | 165 | 1609 | 1517 |
| B* | 22.7 | 10 | 15.7 | 300 | 1038 | 996 |
| C* | 20.1 | 10.6 | 9.5 | 110 | 878 | 907 |
| D* | 34.5 | 6 | 22.3 | 33.6 | 2299 | 2116 |
| 1 | 23.5 | 8.1 | 15.7 | 150 | 1465 | 1394 |
| 2 | 21.3 | 8.5 | 15.6 | 250 | 1235 | 1215 |
| E* | 35.1 | 4 | 28.6 | 17.3 | 3923 | 3504 |
| 3 | 23.7 | 6.6 | 14.9 | 44.4 | 1935 | 1890 |
| 4 | 21.4 | 7.6 | 16.1 | 180 | 1641 | 1610 |
| F* | 22.8 | 7.3 | 10.5 | 340 | 1455 | 1369 |
| G* | 22.8 | 5.4 | 8.6 | 48.4 | 1983 | 1938 |
| H* | 18.4 | 6.2 | 15.4 | >350 | 883 | 686 |
| 5 | 18.8 | 5.7 | 14.7 | 250 | 1453 | 1172 |

*Comparative example only; not an example of the invention

Data Summary Comparative examples A*, D*, and E* in Tables 3, 4 and 5 show that conventional polypropylene and polypropylene filled only with talc are brittle materials, as indicated by the low falling dart impact, Izod impact and Charpy impact values.

Tables 3, 4 and 5 show that although comparative examples B* and C* have improved impact toughness by the addition of an ethylene/α-olefin copolymer, comparative examples B* and C* also have a corresponding decrease in modulus and mechanical strength as indicated in Table 6.

Comparing invention examples 2 and 4 with comparative example C*, which have similar propylene to elastomer ratios, the data in Tables 3, 4 and 5 shows that the filled systems have comparable or higher ductility than the unfilled systems, but have significantly higher moduli (as shown in Table 6).

Invention examples 1 and 3, compared with comparative examples F* and G*, respectively, show that filled compositions of the invention have significantly higher low temperature ductility (Tables 3, 4 and 5) while maintaining similar moduli/tensile properties (Table 6).

Tables 3, 4 and 5 show that talc filled invention example 5, as compared with unfilled comparative examples C* and H*, has exceptionally high ductility for the inventive compositions, even when using a lower molecular weight polypropylene and filled with talc.

We claim:

1. A thermoplastic olefinic polymer composition having good low temperature impact performance comprising:
   (A) a polyolefin,
   (B) at least one substantially linear interpolymer of ethylene with at least one $C_3$–$C_{20}$ α-olefin, wherein the substantially linear interpolymer is characterized as having:
   a) a melt flow ratio, $I_{10}/I_2, \geq 5.63$,
   b) a molecular weight distribution, $M_w/M_n$, defined by the equation: $M_w/M_n \leq (I_{10}/I_2)-4.63$, and
   c) a critical shear rate at onset of surface melt fracture of at least 50 percent greater than the critical shear rate at the onset of surface melt fracture of a linear ethylene/a-olefin polymer having about the same $I_2$ and $M_w/M_n$,
   (C) from about 0.1% to about 80% of at least one filler.

2. A thermoplastic olefinic polymer composition having good low temperature impact performance comprising:
   (A) a polyolefin,
   (B) at least one substantially linear interpolymer of ethylene with at least one $C_3$–$C_{20}$ α-olefin, wherein the substantially linear interpolymer is characterized as having:
   a) a melt flow ratio, $I_{10}/I_2, \geq 5.63$,
   b) a molecular weight distribution, $M_w/M_n$, defined by the equation: $M_w/M_n \leq (I_{10}/I_2)-4.63$, and
   c) a processing index less than or equal to about 70 percent of the PI of a linear ethylene/a-olefin polymer having about the same $I_2$ and $M_w/M_n$, and
   (C) from about 0.1% to about 80% of at least one filler.

3. A thermoplastic olefinic polymer composition having good low temperature impact performance comprising:
   (A) a polyolefin,
   (B) at least one substantially linear interpolymer of ethylene with at least one $C_3$–$C_{20}$ α-olefin, wherein the substantially linear interpolymer is characterized as having:
   a) a melt flow ratio, $I_{10}/I_2, \geq 5.63$, and
   b) a molecular weight distribution, $M_w/M_n$, from about 1.5 to about 2.5, and
   (C) from about 0.1% to about 80% of at least one filler.

4. The composition of claims 1, 2, or 3 wherein the $I_{10}/I_2$ of the substantially linear ethylene/α-olefin polymer is at least about 7.

5. The composition of claims 1, 2, or 3 wherein the $I_{10}/I_2$ of the substantially linear ethylene/α-olefin polymer is at least about 8.

6. The composition of claims 1, 2, or 3 wherein the substantially linear ethylene/α-olefin polymer is a copolymer of ethylene and at least one $C_3$–$C_{20}$ α-olefin.

7. The composition of claims 1, 2, or 3 wherein the substantially linear ethylene/α-olefin polymer is a copolymer of ethylene and at least one $C_4$–$C_{20}$ α-olefin.

8. The composition of claims 1, 2, or 3 wherein the substantially linear ethylene/α-olefin polymer is a copolymer of ethylene and at least one $C_8$–$C_{20}$ α-olefin.

9. The composition of claims 1, 2, or 3 wherein the substantially linear ethylene/α-olefin polymer is a copolymer of ethylene and 1-octene.

10. The composition of claims 1, 2, or 3 wherein the substantially linear ethylene/α-olefin polymer has from about 0.01 to about 3 long chain branches/1000 carbons along the polymer backbone.

11. The composition of claims 1, 2, or 3 wherein the polyolefin is polypropylene.

12. The composition of claims 1, 2, or 3 wherein the filler is talc.

13. The composition of claims 1, 2, or 3 wherein:
   (i) the polyolefin of (A) is polypropylene having a melt flow rate from about 12 g/10 minutes to about 40 g/10 minutes,
   (ii) the substantially linear ethylene/α-olefin polymer of (B) is an ethylene/1-octene copolymer and comprises from about 15 to about 30 percent by weight of the composition, and
   (iii) the filler of (C) is talc and comprises from about 8 to about 30 percent by weight of the composition.

14. A fabricated article made from the composition of claims 1, 2, or 3.

15. The fabricated article of claim 14, wherein the fabricated article is selected from the group consisting of automotive hoses, single ply roofing, and wire and cable voltage insulation.

16. The composition of claims 1, 2, or 3 wherein the filler comprises from about 5% to about 50% of the composition.

17. The composition of claims 1, 2, or 3 wherein the filler comprises from about 5% to about 40% of the composition.

18. The composition of claims 1, 2, or 3 wherein the filler comprises from about 8% to about 30% of the composition.

19. A thermoplastic olefinic polymer composition having an impact performance of at least about 3.6 kJ/m$^2$ at a temperature of −30° C. comprising:
   (A) a thermoplastic selected from the group consisting of thermoplastic polyurethanes, polyvinyl chlorides, styrenics, engineering thermoplastics, and polyolefins,
   (B) about 20 percent by weight of at least one substantially linear interpolymer of ethylene with at least one $C_3$–$C_{20}$ α-olefin, wherein the substantially linear interpolymer is characterized as having:
      a) a melt flow ratio, $I_{10}/I_2$, $\geq 5.63$,
      b) a molecular weight distribution, $M_w/M_n$, defined by the equation: $M_w/M_n \leq (I_{10}/I_2)-4.63$, and
      c) a critical shear rate at onset of surface melt fracture of at least 50 percent greater than the critical shear rate at the onset of surface melt fracture of a linear ethylene/a-olefin polymer having about the same $I_2$ and $M_w/M_n$, and
   (C) from about 0.1% to about 80% of at least one filler.

20. A thermoplastic olefinic polymer composition having an impact performance of at least about 3.6 kJ/m$^2$ at a temperature of −30° C. comprising:
   (A) a thermoplastic selected from the group consisting of thermoplastic polyurethanes, polyvinyl chlorides, styrenics, engineering thermoplastics, and polyolefins,
   (B) about 20 percent by weight of at least one substantially linear interpolymer of ethylene with at least one $C_3$–$C_{20}$ α-olefin, wherein the substantially linear interpolymer is characterized as having:
      a) a melt flow ratio, $I_{10}/I_2$, $\geq 5.63$,
      b) a molecular weight distribution, $M_w/M_n$, defined by the equation: $M_w/M_n \leq (I_{10}/I_2)-4.63$, and
      c) a processing index less than or equal to about 70 percent of the PI of a linear ethylene/a-olefin polymer having about the same $I_2$ and $M_w/M_n$,
   (C) from about 0.1% to about 80% of at least one filler.

21. A thermoplastic olefinic polymer composition having an impact performance of at least about 3.6 kJ/m$^2$ at a temperature of −30° C. comprising:
   (A) a thermoplastic selected from the group consisting of thermoplastic polyurethanes, polyvinyl chlorides, styrenics, engineering thermoplastics, and polyolefins,
   (B) about 20 percent by weight of at least one substantially linear interpolymer of ethylene with at least one $C_3$–$C_{20}$ α-olefin, wherein the substantially linear interpolymer is characterized as having:
      a) a melt flow ratio, $I_{10}/I_2$, $\geq 5.63$, and
      b) a molecular weight distribution, $M_w/M_n$, from about 1.5 to about 2.5, and
   (C) from about 0.1% to about 80% of at least one filler.

* * * * *